(12) United States Patent
Koike et al.

(10) Patent No.: US 10,364,759 B2
(45) Date of Patent: Jul. 30, 2019

(54) VEHICLE TRAVELING CONTROL METHOD AND VEHICLE TRAVELING CONTROL DEVICE

(71) Applicant: NISSAN MOTOR CO., LTD., Kanagawa (JP)

(72) Inventors: Tomoyuki Koike, Kanagawa (JP); Munemitsu Watanabe, Kanagawa (JP); Akifumi Koishi, Kanagawa (JP); Terumasa Tsuchiya, Kanagawa (JP); Masahiko Tahara, Kanagawa (JP); Atsushi Tezuka, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 6 days.

(21) Appl. No.: 15/753,511

(22) PCT Filed: Aug. 20, 2015

(86) PCT No.: PCT/JP2015/004183
§ 371 (c)(1),
(2) Date: Feb. 19, 2018

(87) PCT Pub. No.: WO2017/029693
PCT Pub. Date: Feb. 23, 2017

(65) Prior Publication Data
US 2018/0245525 A1 Aug. 30, 2018

(51) Int. Cl.
*F02D 33/00* (2006.01)
*F02M 37/08* (2006.01)
(Continued)

(52) U.S. Cl.
CPC ..... *F02D 33/003* (2013.01); *B60W 30/18072* (2013.01); *F02D 29/02* (2013.01);
(Continued)

(58) Field of Classification Search
CPC .... F02D 33/003; F02D 33/006; F02D 41/042; F02D 41/12; F02D 41/3082; F92D 29/02;
(Continued)

(56) References Cited

U.S. PATENT DOCUMENTS 6,508,225 B1 * 1/2003 Hiki ............... F02B 23/104
123/198 D
9,038,438 B2 * 5/2015 Esteghlal ............ B60W 20/00
73/35.06
(Continued)

FOREIGN PATENT DOCUMENTS

DE 102014103835 A1 9/2014
DE 112012007079 T5 8/2015
(Continued)

*Primary Examiner* — Mahmoud Gimie
(74) *Attorney, Agent, or Firm* — Osha Liang LLP

(57) ABSTRACT

A vehicle traveling control method includes detecting a remaining fuel amount in a fuel tank including a fuel chamber in which a suction port of a fuel pump is disposed for sucking fuel to be supplied to an engine, the fuel tank being configured to generate negative pressure for sucking fuel to the fuel chamber by ejecting a part of fuel sucked by the fuel pump into the fuel chamber via a fuel line, permitting, when a predetermined condition is satisfied, inertial traveling during which a vehicle travels, with the engine kept stopped, operating, when the detected remaining fuel amount is less than a first threshold, the fuel pump despite the engine stopped owing to the inertial traveling, and prohibiting stop of the engine when the detected remaining fuel amount is less than a second threshold smaller than the first threshold.

7 Claims, 9 Drawing Sheets

(51) Int. Cl.
  *F02M 37/18* (2006.01)
  *F02D 29/02* (2006.01)
  *B60W 30/18* (2012.01)
  *F02D 41/04* (2006.01)
  *F02D 41/12* (2006.01)
  *F02M 37/02* (2006.01)
  *F02M 37/10* (2006.01)
  *F02D 41/30* (2006.01)
  *F02N 11/08* (2006.01)
  *F02N 11/04* (2006.01)

(52) U.S. Cl.
  CPC ......... *F02D 33/006* (2013.01); *F02D 41/042* (2013.01); *F02D 41/12* (2013.01); *F02D 41/3082* (2013.01); *F02M 37/025* (2013.01); *F02M 37/08* (2013.01); *F02M 37/106* (2013.01); *F02M 37/18* (2013.01); *F02N 11/0818* (2013.01); *F02N 11/0825* (2013.01); *F02N 11/0833* (2013.01); *B60W 2560/02* (2013.01); *F02D 2200/06* (2013.01); *F02N 11/04* (2013.01); *F02N 2200/061* (2013.01); *F02N 2200/08* (2013.01); *F02N 2200/101* (2013.01); *Y02T 10/48* (2013.01)

(58) Field of Classification Search
  CPC .... F02M 37/025; F02M 37/08; F02M 37/106; F02N 11/0818; F02N 11/0825; F02N 11/0833; B60W 30/18072
  USPC .......................... 701/112; 123/511, 512, 509
  See application file for complete search history.

(56) References Cited

U.S. PATENT DOCUMENTS

| | | | |
|---|---|---|---|
| 9,039,385 B2* | 5/2015 | Myers | F04F 5/46 417/151 |
| 2001/0023687 A1* | 9/2001 | Ushigome | F02M 37/025 123/509 |
| 2013/0019843 A1* | 1/2013 | Iwaya | B60K 15/077 123/512 |
| 2015/0300274 A1* | 10/2015 | Kuroki | F02D 41/0087 701/67 |

FOREIGN PATENT DOCUMENTS

| | | |
|---|---|---|
| JP | 2012-47148 A | 3/2012 |
| JP | 2013-23043 A | 2/2013 |
| JP | 2013-60881 A | 4/2013 |

\* cited by examiner

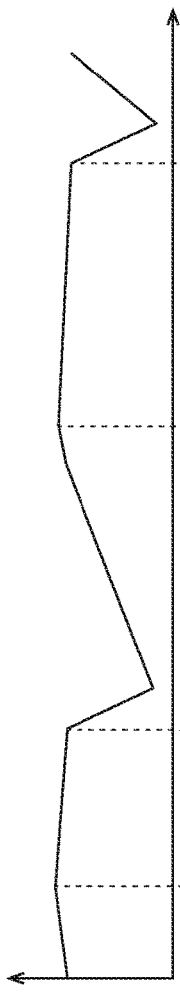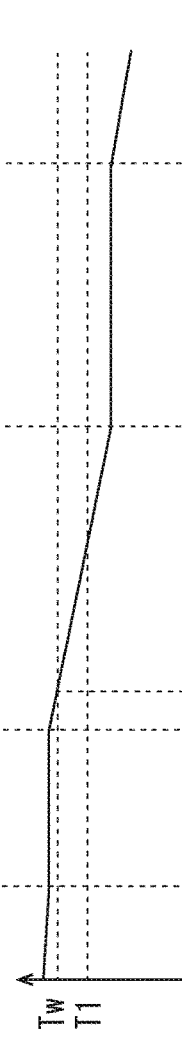

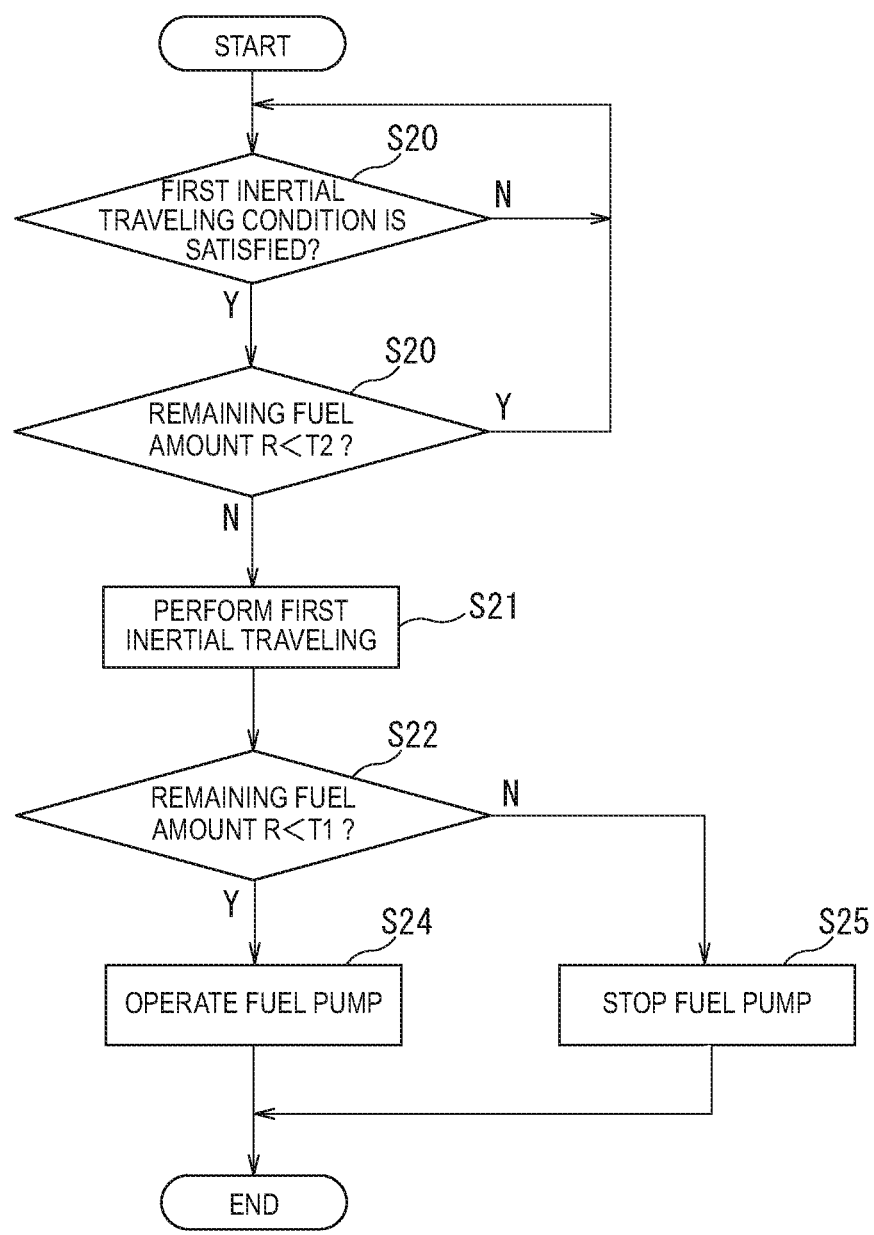

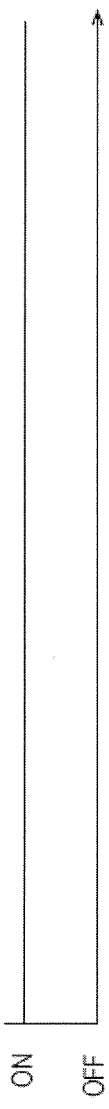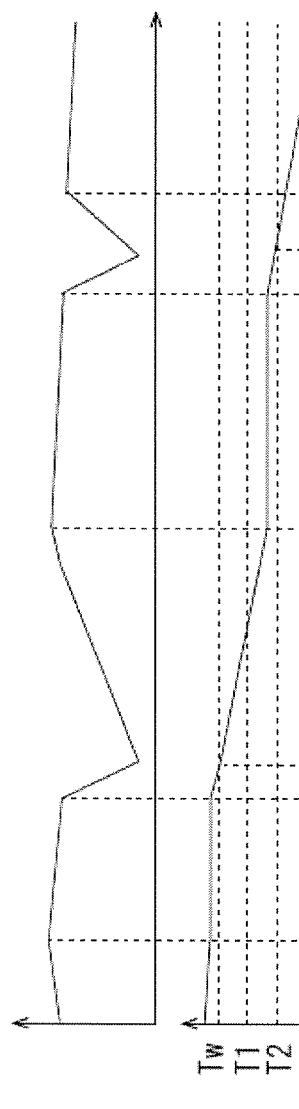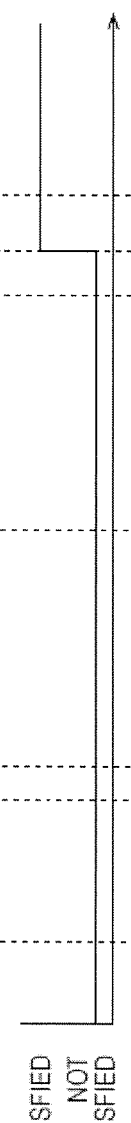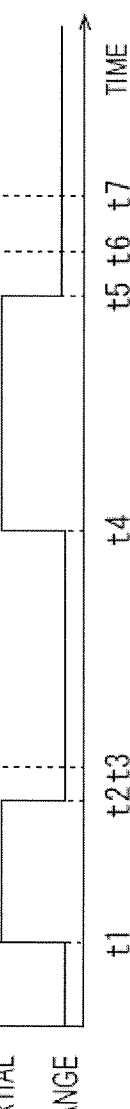

VEHICLE TRAVELING CONTROL METHOD AND VEHICLE TRAVELING CONTROL DEVICE

BACKGROUND

Technical Field

The present invention relates to a vehicle traveling control method and a vehicle traveling control device.

Related Art

A control device for controlling a vehicle is disclosed in PTL1, which device stops the engine of a vehicle and decelerates the vehicle by inertial traveling when a vehicle speed detected by a vehicle speed detection means is higher than a lower limit, and which starts the engine and accelerates the vehicle when the vehicle speed detected by the vehicle speed detection means drops below the lower limit.

CITATION LIST

Patent Literature

PTL 1: JP 2012-47178 A

SUMMARY OF INVENTION

Fuel in a fuel tank is sucked by a fuel pump and sent to the engine of a vehicle. Some fuel tanks include a fuel chamber in which is disposed the suction port of a fuel pump, which ejects a part of fuel sucked from the fuel chamber into the fuel chamber via a fuel line, to generate negative pressure by which fuel in a region outside the fuel chamber of the fuel tank is sucked into the fuel chamber.

For such fuel tanks, when the fuel pump is stopped upon engine stop during inertial traveling, the fuel line through which a part of fuel sucked by the fuel pump is returned to the fuel chamber is no longer filled with fuel, and therefore, it may be impossible to obtain negative pressure for sucking fuel to the fuel chamber immediately after engine restart. As a result, when the remaining fuel amount in the fuel tank is small, and moreover, the fuel in the fuel chamber is in a one-sided distribution owing to, for example, the tilt of the vehicle, a sufficient amount of fuel cannot be sucked from the suction port of the fuel pump and the restart of the engine is likely to be delayed.

One or more embodiments of the present invention makes the delayed restart of the engine less likely to occur at the end of inertial traveling when the remaining fuel amount in the fuel tank is small.

According to one or more embodiments of the present invention, there is provided a vehicle traveling control method including: detecting a remaining fuel amount in a fuel tank including a fuel chamber in which a suction port of a fuel pump is disposed for sucking fuel to be supplied to an engine, the fuel tank being configured to generate negative pressure for sucking fuel to the fuel chamber by ejecting a part of fuel sucked by the fuel pump into the fuel chamber via a fuel line; permitting, when a predetermined condition is satisfied, inertial traveling during which a vehicle travels, with the engine kept stopped; and operating, when the detected remaining fuel amount is less than a first threshold, the fuel pump despite the engine stopped owing to the inertial traveling.

It is to be understood that both the above general description and the following detailed description are merely exemplary and explanatory and are not restrictive of the present invention as claimed.

BRIEF DESCRIPTION OF DRAWINGS

FIGS. 5A to 5F are time charts explaining the operation of the vehicle traveling control device according to the first embodiment;

FIG. 8 is a flowchart explaining one processing example by the vehicle traveling control device according to the second embodiment; and FIGS. 9A to 9G are time charts explaining the operation of the vehicle traveling control device according to the second embodiment.

DETAILED DESCRIPTION

Hereinafter, embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment (Configuration)

Figure 1:
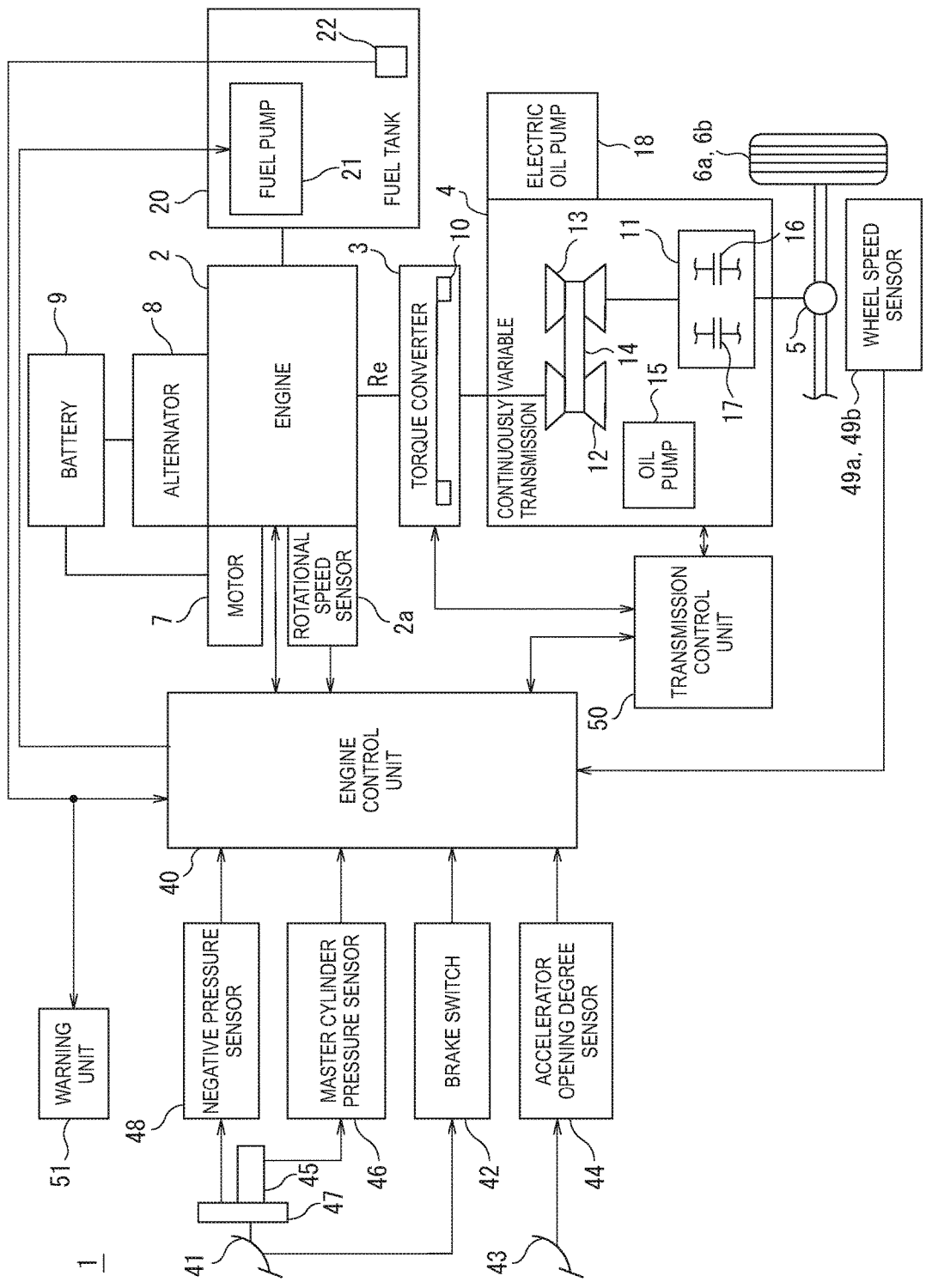
FIG. 1 is a schematic configuration diagram of a vehicle equipped with a vehicle traveling control device according to the first embodiment.

See FIG. 1. An engine 2 which is the internal combustion engine of a vehicle 1 is provided with a torque converter 3 on the output side of the engine. The torque converter 3 is connected to a belt type, continuously variable transmission 4 on the output side of the converter. The rotational driving force output from the engine 2 is input via the torque converter 3 to the continuously variable transmission 4, changed according to a desired gear ratio, and then transmitted via a differential gear 5 to drive wheels 6a and 6b. The engine 2 includes a motor 7 for starting the engine and an alternator 8 for generating electrical power.

The motor 7 may be, for example, a starter motor for engine start or an SSG (Separated Starter Generator) motor provided separately from the starter motor. The motor 7 is driven by using electrical power supplied by a battery 9 to crank the engine on the basis of an engine start command. Further, when the engine 2 reaches its self-sustained rotation after fuel starts to be injected into the engine, the motor 7 is stopped. The alternator 8, rotationally driven by the engine 2, generates electrical power, which is supplied to a device such as the battery 9.

The torque converter 3 amplifies torque at a low vehicle speed. The torque converter 3 has a lock-up clutch 10. When a vehicle speed V is equal to or faster than a predetermined speed V1, the torque converter 3 engages the lock-up clutch 10, to regulate the relative rotation between the output shaft of the engine 2 and the input shaft of the continuously variable transmission 4. The predetermined speed V1 may be, for example, 14 km/h.

The continuously variable transmission 4 includes a forward-reverse switching mechanism 11, a primary pulley 12 and a secondary pulley 13, and a belt 14 set across the primary pulley 12 and the secondary pulley 13. The groove widths of the primary pulley 12 and the secondary pulley 13 are varied by hydraulic control, to achieve a desired gear ratio.

The forward-reverse switching mechanism 11 includes a forward clutch 16 and a reverse brake 17. The forward clutch 16 and the reverse brake 17 are frictionally engaging elements for transmitting rotation transmitted from the secondary pulley 13 in a positive direction (forward direction) and in a negative direction (reverse direction), respectively. The forward clutch 16 and the reverse brake 17 are examples of clutch which transmit the driving force of the engine 2 to the drive wheels 6a and 6b.

In addition, in the continuously variable transmission 4 is provided an oil pump 15 driven by the engine 2. When the engine is in operation, the oil pump 15, as a hydraulic source, supplies the converter pressure of the torque converter 3 and the clutch pressure of the lock-up clutch 10.

Further, the oil pump 15, as a hydraulic source, supplies the pulley pressure of the continuously variable transmission 4 and clutch engagement pressure for the forward clutch 16 and the reverse brake 17. Still further, the continuously variable transmission 4 is provided with an electric oil pump 18, in addition to the oil pump 15, and is configured so as to be capable of supplying necessary oil pressure to each actuator by activating the electric oil pump 18 when an automatic engine stops processing to be described later makes hydraulic supply by the oil pump 15 impossible. Thus, the leakage of hydraulic oil can be compensated and the clutch engagement pressure can be maintained even during engine stop.

Fuel supplied to the engine 2 is stored in a fuel tank 20. The fuel tank 20 includes a fuel pump 21 for sucking fuel in the fuel tank 20 and sending it to the engine 2 and a fuel gauge 22 for detecting a remaining fuel amount R in the fuel tank 20.

Figure 2:
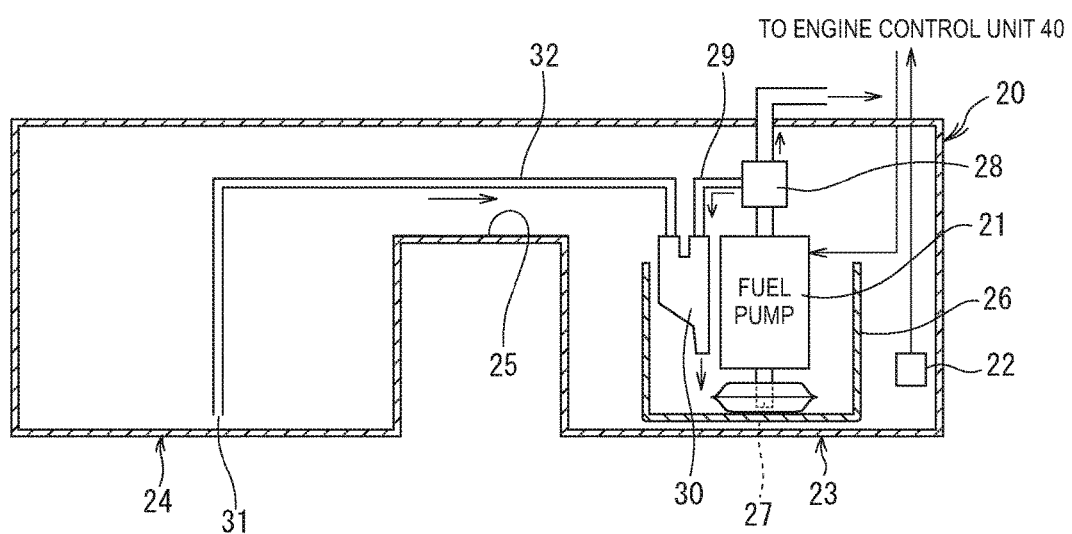
FIG. 2 is a schematic diagram of a fuel tank.
Figure 3:
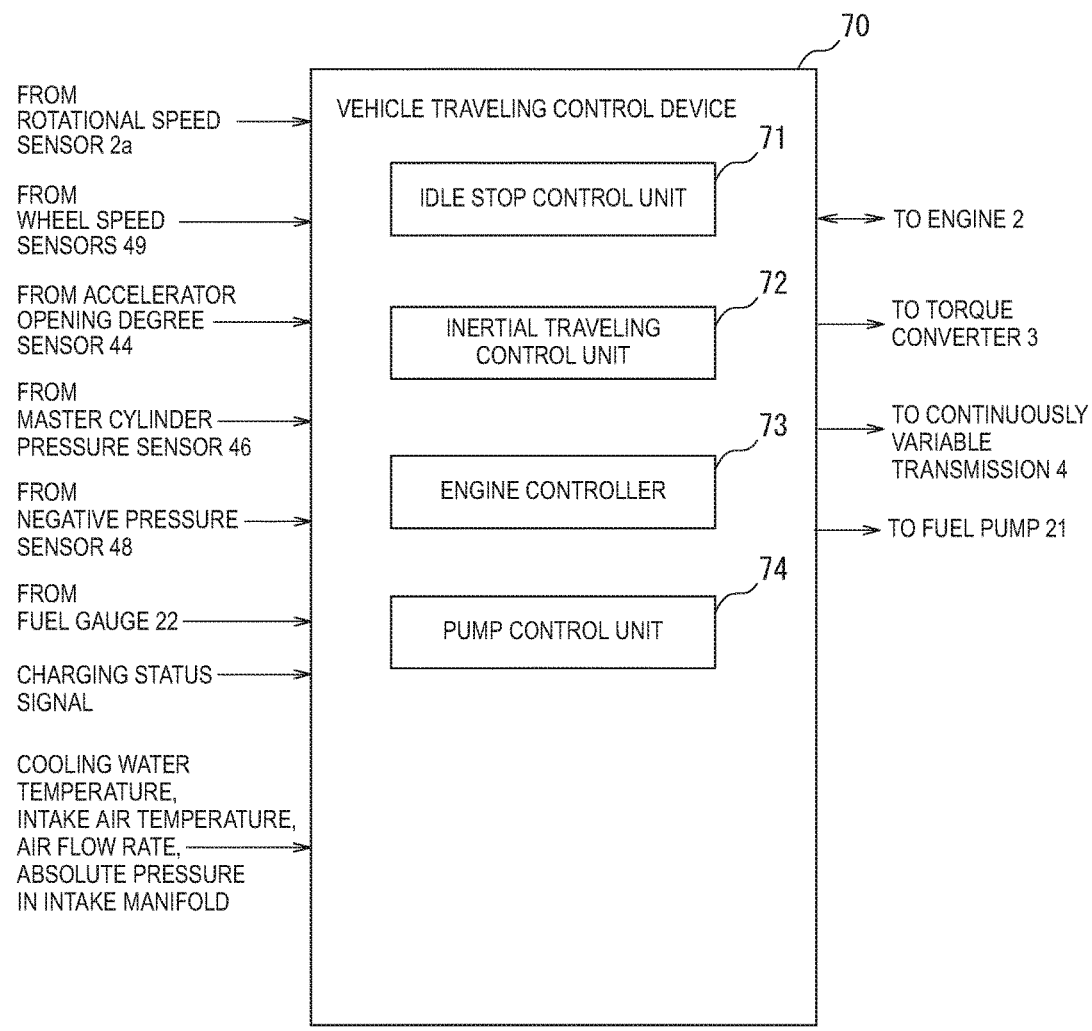
FIG. 3 is a functional configuration diagram of the vehicle traveling control device according to the first embodiment.

See FIG. 2. The fuel tank 20 may be, for example, a saddle type fuel tank provided in an approximately middle region in a vehicle width direction of the vehicle 1. The fuel tank 20 is provided with a first tank 23 and a second tank 24 on the left side and the right side thereof in the vehicle width direction, respectively, and a convex part 25 formed between the first tank 23 and the second tank 24. In other words, the first tank 23 and the second tank 24 are arranged on the opposite sides of the convex part 25 formed in the middle region in the vehicle width direction.

The fuel tank 20 includes a swirl tank 26 therein. The swirl tank 26 is disposed at the bottom of the first tank 23. The swirl tank 26 is provided with a fuel pump 21 and its suction port 27 both disposed therein.

The fuel pump 21 is switched on/off according to a pump control signal from an engine control unit 40, to suck up fuel in the swirl tank 26 via the suction port 27 and send the fuel to the engine 2.

A piping for sending fuel from the fuel pump 21 to the engine 2 is provided with a pressure regulator 28 for regulating the pressure of the fuel to be sent to the engine 2. The pressure regulator 28 branches surplus fuel which was not sent to the engine 2, as return fuel, from the fuel to be sent from the fuel pump 21. The branched return fuel is sent to a jet pump 30 via a fuel line 29.

To the suction port of the jet pump 30 is connected a communication pipe 32, the suction port 31 of which is disposed in the second tank 24. Remaining fuel in the second tank 24 is transferred to the swirl tank 26 via the communication pipe 32 with the aid of negative pressure occurring when the return fuel is ejected from the jet pump 30 into the swirl tank 26. In other words, the remaining fuel in the second tank 24 which is a region outside the swirl tank 26 in the fuel tank 20 is sucked into the swirl tank 26 with the aid of the negative pressure occurred when a part of fuel sucked by the fuel pump 21 is ejected into the swirl tank 26 via the fuel line 29. The swirl tank 26 corresponds to a fuel chamber provided with the suction port 27 of the fuel pump 21 disposed therein.

A fuel gauge 22 is provided, for example, in the first tank 23 of the fuel tank 20 and detects the remaining fuel amount R in the fuel tank 20. The fuel gauge 22 may be, for example, a potentiometer which detects the magnitude of the vertical displacement of a float provided in the fuel gauge 22 by converting the magnitude to a resistance value. The fuel gauge 22 outputs a remaining fuel amount signal, which is then input to the engine control unit 40.

See FIG. 1. The operation status of the engine 2 is controlled by an engine control unit 40. To the engine control unit 40 is input an accelerator pedal operation degree signal from an accelerator pedal opening degree sensor 44 for detecting the operation degree of an accelerator pedal 43 operated by a driver. The accelerator pedal 43 is one example of an operation element operated by the driver to instruct the driving force of the vehicle 1.

Still further, to the engine control unit 40 are input wheel speed signals indicating wheel speeds detected by wheel speed sensors 49a and 49b provided on the drive wheels 6a and 6b. In the following explanation, the wheel speed sensors 49a and 49b may be collectively represented as "wheel speed sensors 49." The wheel speed sensors 49 may be provided on wheels other than the drive wheels. Hereinafter, the drive wheels 6a and 6b, and wheels other than the drive wheels may be collectively represented as "wheels 6."

Still further, to the engine control unit 40 is input a rotational speed signal indicating an engine rotational speed Re from a rotational speed sensor 2a for detecting the engine rotational speed Re of the engine 2.

Still further, to the engine control unit 40 are input signals for quantities such as cooling water temperature in the engine 2, intake air temperature of air supplied to the engine 2, air flow rate, absolute pressure in an intake manifold, and crank angle. Still further, to the engine control unit 40 is input a transmission status signal from a transmission control unit 50 to be described later.

The engine control unit 40 starts the engine 2 and controls the driving force of the engine 2, on the basis of the above-mentioned various signals. The engine control unit 40 calculates engine torque on the basis of the above-mentioned various signals and determines an engine torque command value on the basis of the calculation result. The engine control unit 40 controls the output torque of the engine 2 by controlling parameters such as intake air amount, fuel injection amount, and ignition timing, on the basis of the command value.

Further, to the engine control unit 40 is input a brake signal from a brake switch 42 for outputting an ON signal according to the operation of a brake pedal 41 by a driver. The brake pedal 41 is a second example of an operation element operated by a driver to instruct the braking force of the vehicle 1.

A master cylinder 45 and a master back 47 are provided ahead of the brake pedal 41. The master back 47 amplifies brake operation force with the aid of the intake negative pressure of the engine 2. To the engine control unit 40 is input a brake pedal operation degree signal from a master cylinder pressure sensor 46 for detecting the master cylinder pressure of the master cylinder 45 generated on the basis of the operation degree of the brake pedal 41. Further, to the engine control unit 40 is input a negative pressure signal from a negative pressure sensor 48 for detecting the negative pressure of the master back 47.

Another sensor, such as a sensor for detecting brake pedal stroke degree and brake pedal depression force or a sensor for detecting wheel cylinder pressure may be used, instead of the master cylinder pressure sensor 46, to detect the brake pedal operation degree, which is input to the engine control unit 40.

On the other hand, the transmission control unit 50 receives an engine status signal indicating the engine operation status from the engine control unit 40 and sends a transmission status signal indicating the status of the continuously variable transmission 4 to the engine control unit 40. The transmission control unit 50 controls, for example, the gear ratio of the continuously variable transmission 4, according to these signals and the position of a shift lever.

For example, the transmission control unit 50, when D-range is selected, connects the forward clutch 16, and further determines the gear ratio from a gear ratio map on the basis of the accelerator pedal opening degree and the vehicle speed, to control each pulley pressure. In the following explanation, a representation "D-range traveling" means forward traveling during which the vehicle 1 travels, with the forward clutch 16 kept connected by the selection of D-range and fuel kept supplied to the engine 2.

Further, when the vehicle speed is less than the predetermined speed V1, the lock-up clutch 10 is released, but when the speed is equal to or more than the predetermined speed V1, the lock-up clutch is connected such that the engine 2 and the continuously variable transmission 4 are directly connected.

The remaining fuel amount signal from the fuel gauge 22 is also input to a warning unit 51. The warning unit 51 gives the driver of the vehicle 1 a warning for remaining fuel amount when the remaining fuel amount R indicated by the remaining fuel amount signal is less than a predetermined warning threshold Tw. The warning unit 51 may be a warning lamp which is turned on when the remaining fuel amount R is less than the warning threshold Tw and turned off when it is equal to or more than the warning threshold Tw, to give the driver a visual warning. The warning unit 51 may be a visual display device which gives the driver a visual warning by displaying a predetermined warning message when the remaining fuel amount R is less than the warning threshold Tw. The warning unit 51 may be a sound output device which gives the driver an audible warning by outputting a warning message sound or a warning sound when the remaining fuel amount R is less than the warning threshold Tw. The warning threshold Tw corresponds to a third threshold.

The engine control unit 40 and the transmission control unit 50 may be, for example, computers including a CPU (Central Processing Unit) and a peripheral component for CPU such as a storage device. Respective functions of these computers described herein are implemented by respective CPUs executing computer programs stored in storage devices.

(Automatic Stop Processing of Engine)

Next, automatic stop processing of the engine 2 will be explained. The automatic stop processing is a processing which stops the engine 2 automatically and restarts it when a predetermined condition is satisfied.

The engine control unit 40 performs the automatic stop processing on the basis of wheel speed signals from the wheel speed sensors 49, an accelerator pedal operation degree signal from the accelerator pedal opening degree sensor 44, a brake pedal operation degree signal from the master cylinder pressure sensor 46, a negative pressure signal from the negative pressure sensor 48, and a charging status signal from the battery 9. Further, in the automatic stop processing, the engine control unit 40 controls the fuel pump 21 based on the remaining fuel amount signal from the fuel gauge 22.

The engine control unit 40, the transmission control unit 50, and the fuel gauge 22 configure a vehicle traveling control device 60 for performing the automatic stop processing of the engine 2.

Figure 4:
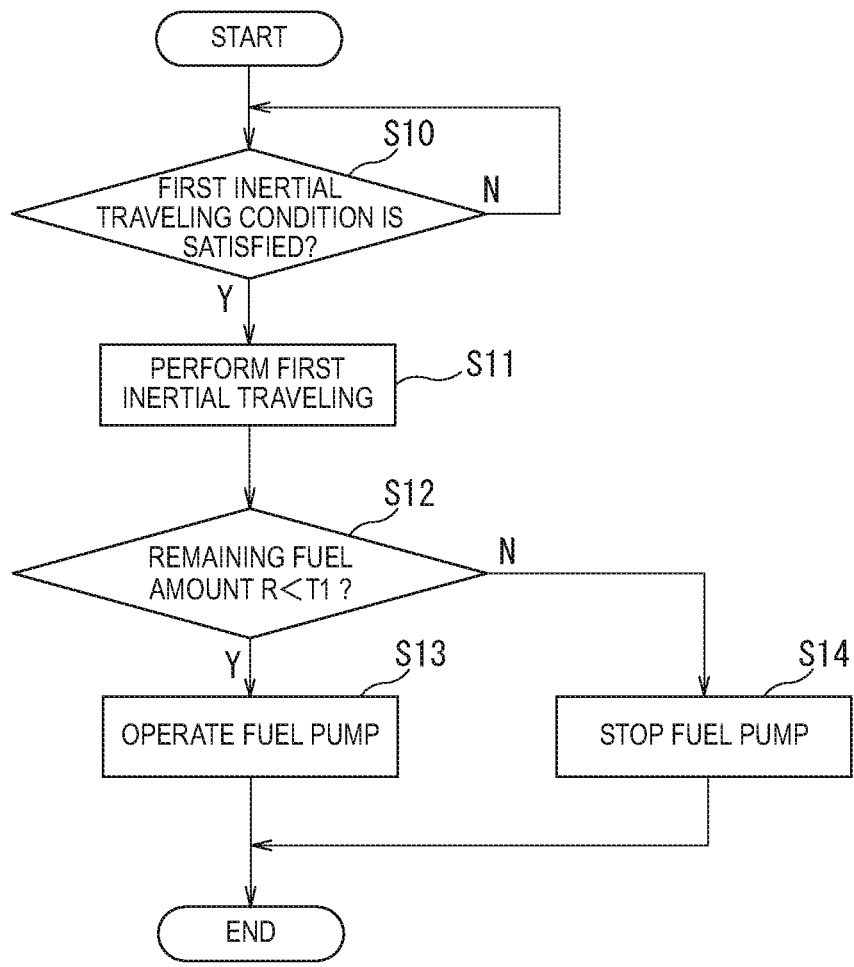
FIG. 4 is a flowchart explaining one processing example by the vehicle traveling control device according to the first embodiment.

FIG. 4 illustrates the functional configuration of the vehicle traveling control device 70. The vehicle traveling control device 70 includes an idle stop control unit 71, an inertial traveling control unit 72, an engine controller 73, and a pump control unit 74.

The idle stop control unit 71 performs so-called idle stop (also called idle reduction) control which stops engine idling when a predetermined condition is satisfied while the vehicle 1 is stopped. A detailed description of the idle stop control is omitted.

The inertial traveling control unit 72 stops fuel injection to the engine 2, disconnects the engine 2 from the drive wheels 6a and 6b, and run the vehicle 1 as is when a predetermined first inertial traveling condition is satisfied even if the speed V is equal to or faster than a speed threshold V2 which is faster than the predetermined speed V1. A representation "first inertial traveling" means traveling during which the speed V is equal to or faster than the speed threshold V2, fuel injection to the engine 2 is kept stopped, in other words, the engine 2 is kept stopped, and the engine 2 is kept disengaged from the drive wheels 6a and 6b.

The inertial traveling control unit 72 receives wheel speed signals from the wheel speed sensors 49, the accelerator pedal operation degree signal from the accelerator pedal opening degree sensor 44, the brake pedal operation degree signal from the master cylinder pressure sensor 46, the negative pressure signal from the negative pressure sensor 48, and the charging status signal from the battery 9. The inertial traveling control unit 72 determines whether or not a first inertial traveling condition is satisfied, on the basis of the wheel speed signals, the accelerator pedal operation degree signal, and the charging status signal.

The first inertial traveling condition is satisfied, for example, when all of the following four conditions (A1) to (A4) are satisfied.

(A1) The speed V is equal to or faster than the speed threshold V2. The speed threshold V2 may be about 30 km/h.

(A2) The speed V is equal to or slower than a speed V3. For example, the speed V3 may be about 80 km/h.

(A3) The driver has no intention for acceleration. For example, when a time equal to longer than a predetermined time elapses after accelerator operation degree (i.e., accelerator depression degree) drops to zero, the condition (A3)

may be determined to be satisfied. The predetermined time is a period during which the accelerator pedal 43 is not operated, the period being set to determine that the driver has no intention for acceleration, and it can be, for example, 2 seconds.

(A4) A predetermined idle stop permission condition is satisfied. The idle stop permission condition may be, for example, that the engine is not under warming-up, and that the charging ratio of the battery 9 is equal to or higher than a predetermined value.

The inertial traveling control unit 72 permits first inertial traveling and outputs an engine stop command to the engine controller 73 when the first inertial traveling condition is satisfied, in other words, when the driver has no intention for acceleration and other conditions (A1), (A2), and (A4) are satisfied.

The engine controller 73 stops fuel injection by the fuel injection device, to stop fuel supply to the engine 2. Further, the engine controller 73 outputs an operation prohibition command for the electric oil pump 18 to the continuously variable transmission 4. Since the oil pump 15 is stopped owing to the stop of the engine 2, and in addition, the electric oil pump 18 does not operate, the forward clutch 16 in the forward-reverse switching mechanism 11 is released. As a result, the engine 2 is disengaged from the drive wheels 6a and 6b. In addition, the lock-up clutch 10 is also released.

Further, during the first inertial traveling, the inertial traveling control unit 72 determines whether or not the predetermined first stop condition is satisfied, on the basis of the wheel speed signals, the accelerator pedal operation degree signal, and the charging status signal. When the first stop condition is satisfied, the inertial traveling control unit 72 prohibits the first inertial traveling, to stop the first inertial traveling. The first stop condition is satisfied when, for example, any one of the following three conditions (B1) to (B3) is satisfied.

(B1) The speed V is slower than the speed threshold V2.

(B2) The driver has an intention for acceleration. For example, the condition (B2) may be determined to be satisfied when the accelerator pedal 43 is depressed.

(B3) The idle stop permission condition is not satisfied.

When the first inertial traveling is stopped, the inertial traveling control unit 72 outputs a restart command to the engine controller 73.

During the first inertial traveling, since fuel injection to the engine 2 is stopped, the fuel pump 21 does not need to suck fuel in the fuel tank 20 and to send it to the engine 2. However, when the fuel pump 21 is stopped during the first inertial traveling, the fuel line 29 through which a part of fuel sucked by the fuel pump 21 is returned to the swirl tank 26 will not be filled with fuel. Accordingly, the jet pump 30 is likely to be incapable of generating the negative pressure for sucking fuel to the swirl tank 26 immediately after the restart of the engine 2 at the end of the first inertial traveling.

In addition, when the fuel pump 21 is stopped, the communication pipe 32 through which remaining fuel in the second tank 24 is transferred to the jet pump 30 will not be filled with fuel. Accordingly, even when negative pressure for sucking fuel to the swirl tank 26 occurs in the jet pump 30, it may be impossible to transfer the remaining fuel in the second tank 24 to the swirl tank 26 until the communication pipe 32 is filled with fuel.

For these reasons, after the fuel pump 21 is stopped, with a small amount of fuel remained in the fuel tank 20, the fuel surface level of the swirl tank 26 may not be kept upon starting the engine.

When fuel is in a one-sided distribution in the swirl tank 26 owing to a reason such as the tilt of the vehicle 1, with the fuel surface level of the swirl tank 26 lowered, the suction port 27 of the fuel pump 21 is situated higher than the surface level of the fuel, leading to insufficient fuel suction from the suction port 27 of the fuel pump 21. As a result, the restart of the engine 2 may be delayed, causing hesitation which is incapability of acceleration of the vehicle 1 in spite of depression of the accelerator pedal 43.

On the other hand, the fuel pump 21, if always in operation during the first inertial traveling, sucks unnecessary fuel from the fuel tank 20 even while the fuel injection of the engine 2 is kept stopped, and therefore, useless electrical power consumption is caused, which deteriorates the fuel-saving effect by the first inertial traveling.

For this reason, when the remaining fuel amount R detected by the fuel gauge 22 is equal to or higher than a predetermined first threshold T1, the vehicle traveling control device 70 stops the fuel tank 20 during the first inertial traveling, and when the remaining fuel amount R is less than the predetermined first threshold T1, the device operates the fuel tank 20 even during the first inertial traveling.

Thus, when the remaining fuel amount R in the fuel tank 20 is small, the fuel surface level in the swirl tank 26 can be kept high by operating the fuel pump 21 during the first inertial traveling.

Accordingly, even when fuel in the swirl tank 26 is in a one-sided distribution and the fuel surface is tilted with respect to the horizontal plane of the vehicle 1, the fuel surface level can be kept higher than the suction port 27 of the fuel pump 21, thereby enabling the fuel pump 21 to suck an sufficient amount of fuel. As a result, the delayed restart of the engine 2 can be made less likely to occur at the end of the first inertial traveling when the remaining fuel amount R in the fuel tank 20 is small.

Since fuel injection to the engine 2 is kept stopped during the first inertial traveling, pressure in the piping for sending fuel to the engine 2 is maintained. Accordingly, fuel sucked by the fuel pump 21 is returned, as return fuel, to the swirl tank 26 via the fuel line 29 and the jet pump 30.

To the first threshold T1 is set a remaining fuel amount R, for example, such that the fuel surface level in the swirl tank 26 is kept higher than the suction port 27 of the fuel pump 21 even when the fuel surface is tilted by a predetermined allowable angle with respect to the horizontal plane of the vehicle 1, with the fuel pump 21 kept stopped.

Further, to the first threshold T1 may be set a value smaller than the warning threshold Tw of the warning unit 51. When the first threshold T1 is set smaller than the warning threshold Tw, first inertial traveling can be performed even after the warning for remaining fuel amount is given by the warning unit 51.

On the other hand, when the remaining fuel amount R in the fuel tank 20 is equal to or more than the first threshold T1 (in other words, when the remaining fuel amount R is sufficiently large), the fuel pump 21 can be stopped during the first inertial traveling, to reduce electrical power consumption and enhance the fuel efficiency improvement effect by first inertial traveling.

The pump control unit 74 receives the remaining fuel amount signal from the fuel gauge 22. The pump control unit 74 determines whether or not the remaining fuel amount R according to the fuel gauge 22 is less than the first threshold T1. When the remaining fuel amount R is less than the first threshold T1, the pump control unit 74 operates the fuel pump 21 during the first inertial traveling. When the remaining fuel amount R is equal to or more than the first threshold T1, the pump control unit 74 stops the fuel pump 21 during the first inertial traveling.

Next, when it is determined that the vehicle 1 is under deceleration and likely to stop via control called "deceleration-and-fuel-cut control" and to transfer to the idling stop control, fuel supply to the engine 2 is stopped. In this case, the vehicle 1 is inertial traveling, with the accelerator pedal 43 not operated by the driver. A representation "second inertial traveling" means traveling during which fuel supply to the engine 2 is kept stopped when it is determined that the vehicle is likely to transfer to the idling stop control. The first inertial traveling and the second inertial traveling may be collectively represented as "inertial traveling." The second inertial traveling may be called coast stop traveling, and a control for stopping fuel supply to the engine 2 during the coast stop traveling may be called coast stop control.

Although fuel injection is kept stopped during the deceleration-and-fuel-cut control, the engine rotational speed Re is maintained by coast torque transmitted via the lock-up clutch 10 from the drive wheels 6a and 6b. However, since the lock-up clutch 10 is released after deceleration down to the predetermined speed V1, the engine 2 will be stopped if no fuel is injected thereto. For this reason, in conventional technologies, the deceleration-and-fuel-cut control is stopped at a timing of releasing the lock-up clutch 10, and fuel injection is restarted to maintain self-sustained engine rotation; then, the engine idling is stopped after the vehicle 1 was completely stopped. However, fuel efficiency can be improved if the amount of fuel upon restarting fuel injection can be further reduced in a process in which fuel injection is temporarily restarted from such a traveling status with fuel injection kept stopped and then the engine is stopped again. For this reason, when a predetermined second inertial traveling condition is satisfied, the engine 2 is kept stopped without restarting fuel injection, and after the vehicle 1 is stopped, it transfers directly to the normal idling stop control.

The inertial traveling control unit 72 determines whether or not the second inertial traveling condition is satisfied, on the basis of the accelerator pedal operation degree signal, the brake pedal operation degree signal, and the charging status signal. The second inertial traveling condition is satisfied, for example, when all of the following three conditions (C1) to (C3) are satisfied.

(C1) The brake pedal operation degree is equal to or greater than a predetermined value.
(C2) The accelerator pedal operation degree is zero.
(C3) The idle stop permission condition is satisfied.

When the second inertial traveling condition is satisfied, the inertial traveling control unit 72 outputs the engine stop command to the engine controller 73. In the automatic stop of the engine 2, the continuously variable transmission 4 activates the electric oil pump 18, to maintain the forward clutch 16 of the forward-reverse switching mechanism 11. Thus, the engagement of the engine 2 with the drive wheels 6a and 6b is maintained. Since the second inertial traveling starts after the deceleration-and-fuel-cut control, the speed V during the second inertial traveling is slower than the predetermined speed V1.

During the second inertial traveling, the inertial traveling control unit 72 determines whether or not a predetermined second stop condition is satisfied, on the basis of the negative pressure signal and the charging status signal. When the second stop condition is satisfied, the inertial traveling control unit 72 prohibits the second inertial traveling and stops the second inertial traveling. The second stop condition is satisfied, for example, when any one of the following two conditions (D1) and (D2) is satisfied.

(D1) The negative pressure of the master back 47 is less than a predetermined value.
(D2) The idle stop permission condition is not satisfied.

When the second stop condition is satisfied, the inertial traveling control unit 72 outputs the restart command to the engine controller 73.

As described above, the vehicle traveling control device 70 can make the delayed restart of the engine 2 less likely to occur at the end of first inertial traveling during which the remaining fuel amount R in the fuel tank 20 is small, while improving the fuel efficiency of the vehicle 1 by increasing an occasion of engine stop owing to first inertial traveling and second inertial traveling. This makes it possible to secure drivability during first inertial traveling performed when the remaining fuel amount R in the fuel tank 20 is small.

(Operation)

Next, one example of the processing of the vehicle traveling control device 70 according to the first embodiment will be explained. See FIG. 4.

In a step S10, the inertial traveling control unit 72 determines whether or not the first inertial traveling condition is satisfied. When the first inertial traveling condition is satisfied (step S10: Y), the processing goes to a step S11. When the inertial traveling condition is not satisfied (step S10: N), the inertial traveling control unit 72 does not permit the start of first inertial traveling and makes the processing return to the step S10.

In the step S11, the inertial traveling control unit 72 outputs the engine stop command to the engine controller 73, to start first inertial traveling.

In a step S12, the pump control unit 74 determines whether or not the remaining fuel amount R according to the fuel gauge 22 is less than the first threshold T1. When the remaining fuel amount R is less than the first threshold T1 (step S12: Y), the processing goes to a step S13. When the remaining fuel amount R is equal to or more than the first threshold T1 (step S12: N), the processing goes to a step S14.

In the step S13, the pump control unit 74 operates the fuel pump 21. Then the processing ends. In the step S14, the pump control unit 74 stops the fuel pump 21. Then the processing ends.

Next, an example of operation of the vehicle traveling control device 70 according to the first embodiment will be described with reference to FIGS. 5A to 5F. When the first inertial traveling condition is satisfied at a time t1 as illustrated in FIG. 5E, the traveling status of the vehicle 1 is shifted from D-range traveling to first inertial traveling as illustrated in FIG. 5F. As illustrated in FIG. 5C, the remaining fuel amount R in the fuel tank 20 is larger than the first threshold T1 and the warning threshold Tw at a time t1. Therefore, as illustrated in FIG. 5D, the pump control unit 74 stops the fuel pump 21.

Then, when the first stop condition is satisfied at a time t2 and the first inertial traveling condition is no longer satisfied as illustrated in FIG. 5E, the traveling status of the vehicle 1 is shifted from the first inertial traveling to the D-range traveling as illustrated in FIG. 5F. Therefore, as illustrated in FIG. 5D, the pump control unit 74 activates the fuel pump 21. As illustrated in FIG. 5C, when the remaining fuel amount R drops below the warning threshold Tw at a time t3, the warning unit 51 gives the warning for remaining fuel amount.

As illustrated in FIG. 5E, when the first inertial traveling condition is satisfied at a time t4, the traveling status of the vehicle 1 is shifted from the D-range traveling to the first inertial traveling as illustrated in FIG. 5F. As illustrated in FIG. 5C, the remaining fuel amount R in the fuel tank 20 at the time t4 is less than the first threshold T1. Accordingly, as illustrated in FIG. 5D, the pump control unit 74 activates the fuel pump 21.

Then, when the first stop condition is satisfied at a time t5 and the first inertial traveling condition is no longer satisfied as illustrated in FIG. 5E, the traveling status of the vehicle 1 is shifted from the first inertial traveling to the D-range traveling as illustrated in FIG. 5F.

(1) The fuel tank 20 includes a swirl tank 26 in which is disposed the suction port 27 of the fuel pump 21 for sucking fuel to be supplied to the engine 2. The negative pressure for sucking fuel to the swirl tank 26 is generated by ejecting a part of fuel sucked by the fuel pump 21 into the swirl tank via the fuel line 29. The fuel gauge 22 detects the remaining fuel amount R in the fuel tank 20. When the predetermined first inertial traveling condition is satisfied, the inertial traveling control unit 72 permits first inertial traveling during which the vehicle travels, with its engine 2 kept stopped. When the remaining fuel amount R is less than the first threshold T1, the pump control unit 74 operates the fuel pump 21 despite the engine 2 stopped owing to the first inertial traveling.

Accordingly, even when the remaining fuel amount R in the fuel tank 20 is small, the fuel surface level in the swirl tank 26 can be kept high, and even when the fuel surface in the swirl tank 26 is tilted with respect to the horizontal plane of the vehicle 1, the fuel pump 21 can suck a sufficient amount of fuel. Accordingly, the delayed restart of the engine 2 and hesitation at the end of the first inertial traveling can be made less likely to occur.

(2) The pump control unit 74 stops the fuel pump 21 when the remaining fuel amount R is equal to or larger than the first threshold T1 and the engine 2 is stopped owing to the first inertial traveling. Accordingly, the fuel pump 21 stops unnecessary suction of fuel in the fuel tank 20, and therefore, the fuel efficiency improvement effect by first inertial traveling can be enhanced.

(3) The warning unit 51 gives the warning for remaining fuel amount when the remaining fuel amount R is less than the warning threshold Tw larger than the first threshold T1. Accordingly, the first inertial traveling can be started even after the warning is given by the warning unit 51.

Modified Example (1) When the fuel surface in the swirl tank 26 is tilted with respect to the horizontal plane of the vehicle 1, the fuel surface level after stopping the fuel pump 21 tends to be lower than the suction port 27 of the fuel pump 21, making failure to restart the engine 2 likely to occur. Accordingly, the first threshold T1 is changed in accordance with the magnitude of a tilt factor which tilts the surface of fuel in the fuel tank 20 with respect to the horizontal plane of the vehicle, and it is possible to make the failure to restart the engine 2 unlikely to occur, by increasing the first threshold T1 on the basis of which the fuel pump 21 is activated in accordance with the tilt of the fuel surface.

Figure 6:
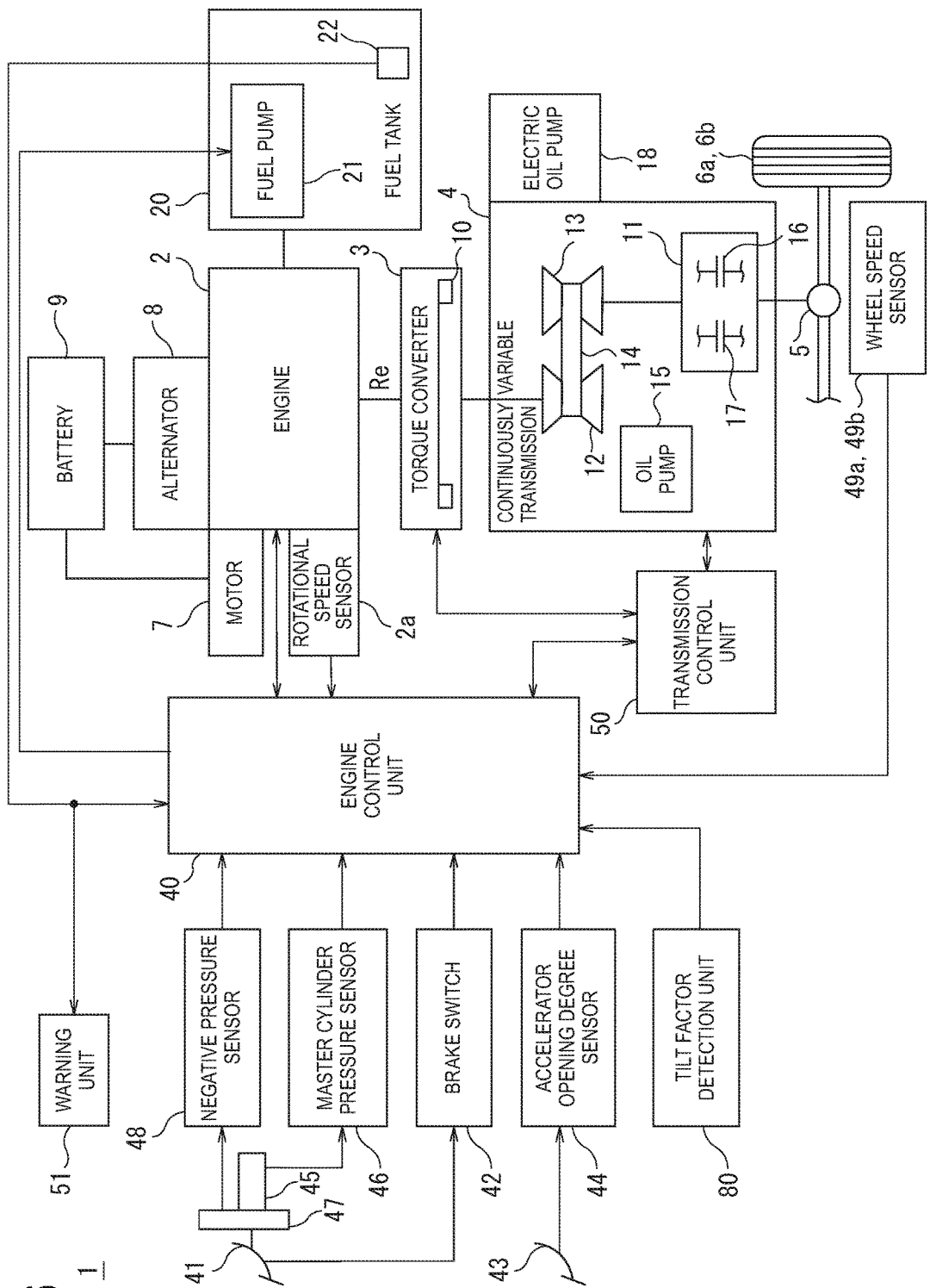
FIG. 6 is a schematic configuration diagram of a vehicle equipped with a vehicle traveling control device according to modified example.

See FIG. 6. The same reference signs are used for the similar components as those in the first embodiment. The vehicle 1 includes a tilt factor detection unit 80 for detecting a tilt factor which tilts the fuel surface in the fuel tank 20 with respect to the horizontal plane of the vehicle.

The tilt factor may be, for example, the slope of a travel route for the vehicle 1. The pump control unit 74 may set a larger first threshold T1 for a steeper slope and a smaller first threshold T1 for a gentler slope. In this case, the tilt factor detection unit 80 may be a tilt sensor for detecting the tilt of the vehicle 1. Alternatively, the tilt factor detection unit 80 may be an information processing device such as a navigation device which determines, from map information, the slope of a travel route at the present position of the vehicle 1.

The tilt factor may also be, for example, the transverse acceleration of the vehicle 1. The pump control unit 74 may set a larger first threshold T1 for a larger transverse acceleration and a smaller first threshold T1 for a smaller transverse acceleration.

In this case, the tilt factor detection unit 80 may be an acceleration sensor for detecting the transverse acceleration of the vehicle 1. Alternatively, the tilt factor detection unit 80 may include a steering angle sensor for detecting the steering angle of the vehicle 1. The tilt factor detection unit 80 may detect the transverse acceleration of the vehicle 1 on the basis of wheel speed signals from the wheel speed sensors 49 and the steering angle of the vehicle 1.

(2) The fuel tank 20 may not include a swirl tank 26. In other words, the fuel pump 21 and its suction port 27 are disposed in the first tank 23, and remaining fuel in the second tank 24 may be transferred to the first tank 23 via the communication pipe 32 by negative pressure generated when return fuel is ejected from the jet pump 30 into the first tank 23. In this case, the first tank 23 corresponds to a fuel chamber in which is disposed the suction port 27 of the fuel pump 21.

The fuel tank 20 may not be a saddle type fuel tank. In other words, the fuel tank 20 may not include the second tank 24. In this case, remaining fuel outside the swirl tank 26 in first tank 23 may be transferred to the swirl tank 26 by negative pressure generated when the return fuel is ejected from the jet pump 30 into the swirl tank 26.

(3) The vehicle traveling control device 70 can also be applied to vehicles adopting an automatic transmission of a type other than the continuously variable transmission 4. For example, the vehicle traveling control device 70 can also be applied to vehicles adopting an automatic transmission of a type with a gear pair with parallel axis. Further, the vehicle traveling control device 70 can be applied not only to vehicles including only an internal combustion engine as a driving source, but also to hybrid vehicles.

(4) During the first inertial traveling, the vehicle traveling control device 70 may output, to the continuously variable transmission 4, a release signal for actively releasing the forward clutch 16, instead of the operation prohibition command for the electric oil pump 18.

Second Embodiment (Configuration)

Next, the second embodiment will be explained. When the remaining fuel amount R in the fuel tank 20 drops below the first threshold T1 and then decreases further, the fuel surface level of the swirl tank 26 may drops even when the fuel pump 21 is operated, making failure to restart the engine 2 at the end first inertial traveling likely to occur.

For this reason, the vehicle traveling control device 70 of the second embodiment prohibits first inertial traveling when the remaining fuel amount R is less than a second threshold T2 smaller than the first threshold T1. This makes the delayed restart of the engine 2 and hesitation at the end of first inertial traveling less likely to occur and secures the drivability of the vehicle 1. On the other hand, the fuel efficiency of the vehicle 1 can be improved and the cruisable distance of the vehicle 1 can be extended by extended by enlarging range of permitting first inertial traveling by permitting first inertial traveling when the remaining fuel amount R is less than the first threshold T1 and equal to or more than the second threshold T2.

Figure 7:
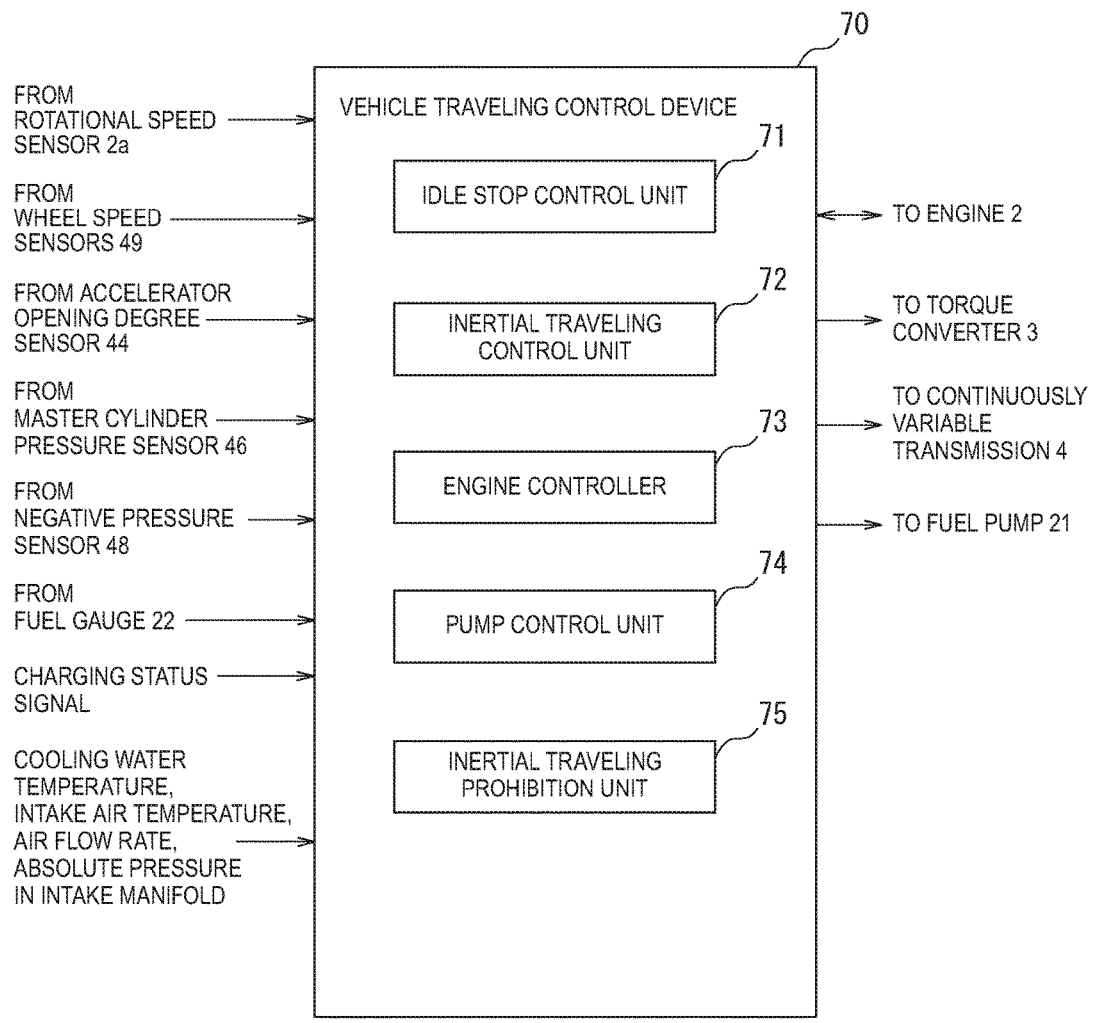
FIG. 7 is a functional configuration diagram of a vehicle traveling control device according to the second embodiment.

See FIG. 7. The same reference signs are used for the similar components as those in the first embodiment. The vehicle traveling control device 70 includes an inertial traveling prohibition unit 75. The inertial traveling prohibition unit 75 receives the remaining fuel amount signal from the fuel gauge 22. The inertial traveling prohibition unit 75 determines whether or not the remaining fuel amount R according to the fuel gauge 22 is less than the second threshold T2. The inertial traveling prohibition unit 75 prohibits the start of first inertial traveling when the remaining fuel amount R is less than the second threshold T2. For example, the inertial traveling prohibition unit 75 prohibits the inertial traveling control unit 72 from outputting the engine stop command. The inertial traveling prohibition unit 75 does not prohibit the start of first inertial traveling when the remaining fuel amount R is equal to or more than the second threshold T2. For this reason, when the remaining fuel amount R is equal to or more than the second threshold T2 and the first inertial traveling condition is satisfied, the start of the first inertial traveling condition is permitted.

(Operation)

Next, an example of the processing of the vehicle traveling control device 70 according to the second embodiment will be explained. See FIG. 8.

In a step S20, the inertial traveling control unit 72 determines whether or not the first inertial traveling condition is satisfied. When the first inertial traveling condition is satisfied (step S20: Y), the processing goes to a step S21. When the inertial traveling condition is not satisfied (step S20: N), the inertial traveling control unit 72 does not permit the start of first inertial traveling and makes the processing return to the step S20.

In the step S21, the inertial traveling prohibition unit 75 determines whether or not the remaining fuel amount R according to the fuel gauge 22 is less than the second threshold T2.

When the remaining fuel amount R is less than the second threshold T2 (step S21: Y), the inertial traveling prohibition unit 75 makes the processing return to the step S20 without permitting the start of first inertial traveling. In other words, the inertial traveling prohibition unit 75 prohibits the start of first inertial traveling.

When the remaining fuel amount R is equal to or more than the second threshold T2 (step S21: N), the processing goes to a step S22.

The processing from the steps S22 to S25 is similar to the processing from the steps S11 to S14 described with reference to FIG. 4.

Next, an example of the operation of the vehicle traveling control device 70 according to the second embodiment will be described with reference to FIGS. 9A to 9G. The operation from a time t1 to a time t5 is similar to that of the first embodiment described with reference to FIGS. 5A to 5F.

As illustrated in FIG. 9C, when the remaining fuel amount R drops below the second threshold T2 at a time t6, a condition (R<R2) on the basis of which the inertial traveling prohibition unit 75 prohibits first inertial traveling is satisfied as illustrated in FIG. 9F. This status continues even at a time t7 when the first stop condition is satisfied as illustrated in FIG. 9F. For this reason, the start of first inertial traveling is prohibited as illustrated in FIG. 9G, and the D-range traveling continues.

The inertial traveling prohibition unit 75 prohibits first inertial traveling when the detected remaining fuel amount R is less than the second threshold T2 smaller than the first threshold T1. As a result, the drivability of the vehicle 1 can be secured by prohibiting the start of first inertial traveling when failure to restart the engine 2 is likely to occur at the end of first inertial traveling owing the low fuel surface level of the swirl tank 26 despite the operation of the fuel pump 21. On the other hand, the fuel efficiency of the vehicle 1 can be improved and the cruisable distance of the vehicle 1 can be extended by enlarging range of permitting first inertial traveling by permitting first inertial traveling when the remaining fuel amount R is less than the first threshold T1 and equal to or more than the second threshold T2.

Modified Example

The second threshold T2 may be changed according to the magnitude of a tilt factor which tilts the fuel surface in the fuel tank 20 with respect to the horizontal plane of the vehicle. For example, a larger second threshold T2 may be set for a larger tilt factor. By increasing the second threshold T2 on the basis of which the start of first inertial traveling is prohibited according to the tilt of the fuel surface, it is facilitated to prohibit the start of first inertial traveling, with the fuel surface tilted which makes failure to restart the engine 2 likely to occur, and accordingly, the drivability of the vehicle 1 is secured.

Although the description has been given with reference to a limited number of embodiments, the scope of rights is not limited thereto, and a modification of each of the embodiments based on the above disclosure is within the scope of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

1 . . . vehicle, 2 . . . engine, 2a . . . rotational speed sensor, 3 . . . torque converter, 4 . . . continuously variable transmission, 5 . . . differential gear, 6a to 6b . . . drive wheel, 7 . . . motor, 8 . . . alternator, 9 . . . battery, 10 . . . lock-up clutch, 11 . . . forward and backward switching mechanism, 12 . . . primary pulley, 13 . . . secondary pulley, 14 . . . belt, 15 . . . oil pump, 16 . . . forward clutch, 17 . . . reverse brake, 18 . . . electric oil pump, 19 . . . rotational speed sensor, 20 . . . fuel tank, 21 . . . fuel pump, 22 . . . fuel gauge, 23 . . . first tank, 24 . . . second tank, 25 . . . convex part, 26 . . . swirl tank, 27 . . . suction port, 28 . . . pressure regulator, 29 . . . fuel line, 30 . . . jet pump, 31 . . . inlet, 32 . . . communication pipe, 40 . . . engine control unit, 41 . . . brake pedal, 42 . . . brake switch, 43 . . . accelerator pedal, 44 . . . accelerator pedal opening degree sensor, 45 . . . master cylinder, 46 . . . master cylinder pressure sensor, 47 . . . master back, 48 . . . negative pressure sensor, 49a to 49b . . . wheel speed sensor, 50 . . . transmission control unit, 51 . . . warning unit, 70 . . . vehicle traveling control device, 71 . . . idle stop control unit, 72 . . . inertial traveling control unit, 73 . . . engine controller, 74 . . . pump control unit, 75 . . . inertial traveling prohibition unit, 80 . . . tilt factor detection unit

The invention claimed is:

1. A vehicle traveling control method comprising:
    detecting a remaining fuel amount in a fuel tank including a fuel chamber in which a suction port of a fuel pump is disposed for sucking fuel to be supplied to an engine, the fuel tank being configured to generate negative pressure for sucking fuel to the fuel chamber by ejecting a part of fuel sucked by the fuel pump into the fuel chamber via a fuel line;
    permitting, when a predetermined condition is satisfied, inertial traveling during which a vehicle travels, with the engine kept stopped;
    operating, when the detected remaining fuel amount is less than a first threshold, the fuel pump despite the engine stopped owing to the inertial traveling; and
    prohibiting stop of the engine when the detected remaining fuel amount is less than a second threshold smaller than the first threshold.

2. The vehicle traveling control method according to claim 1, further comprising:
    stopping the fuel pump when the detected remaining fuel amount is equal to or more than the first threshold and the engine is stopped during the inertial traveling.

3. The vehicle traveling control method according to claim 1, further comprising:
    giving a warning for remaining fuel amount when the detected remaining fuel amount is less than a third threshold larger than the first threshold.

4. The vehicle traveling control method according to claim 1, further comprising:
    detecting a tilt factor tilting a fuel surface in the fuel tank with respect to a horizontal plane of the vehicle; and
    changing the first threshold according to a detected magnitude of the tilt factor.

5. The vehicle traveling control method according to claim 1, further comprising:
    detecting a tilt factor tilting the fuel surface in the fuel tank with respect to a horizontal plane of the vehicle; and
    changing the second threshold according to the detected magnitude of the tilt factor.

6. A vehicle traveling control device for controlling traveling of a vehicle, the vehicle including a fuel tank including a fuel chamber in which a suction port of a fuel pump is disposed for sucking fuel to be supplied to an engine, the fuel tank being configured to generate negative pressure for sucking fuel to the fuel chamber by ejecting a part of fuel sucked by the fuel pump into the fuel chamber via a fuel line, the vehicle traveling control device comprising:
    a fuel gauge configured to detect a remaining fuel amount in the fuel tank; and
    a controller configured to permit, when a predetermined condition is satisfied, inertial traveling during which the vehicle travels, with the engine stopped, and to operate, when the detected remaining fuel amount is less than a first threshold, the fuel pump despite the engine stopped owing to inertial traveling; and
    wherein the controller is configured to prohibit stop of the engine when the detected remaining fuel amount is less than a second threshold smaller than the first threshold.

7. The vehicle traveling control device according to claim 6,
    wherein the controller is configured to give a warning for remaining fuel amount when the detected remaining fuel amount is less than a third threshold larger than the first threshold.

* * * * *